US008078384B2

(12) United States Patent
Glugla et al.

(10) Patent No.: US 8,078,384 B2
(45) Date of Patent: Dec. 13, 2011

(54) ENGINE CONTROL USING SPARK RESTRIKE/MULTI-STRIKE

(75) Inventors: Christopher Paul Glugla, Macomb, MI (US); Garlan J. Huberts, Milford, MI (US); Gopichandra Surnilla, West Bloomfield, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/823,394

(22) Filed: Jun. 25, 2010

(65) Prior Publication Data

US 2011/0144881 A1 Jun. 16, 2011

(51) Int. Cl.
*G06F 19/00* (2011.01)
*F02P 15/08* (2006.01)

(52) U.S. Cl. ......................... 701/102; 701/110; 123/637

(58) Field of Classification Search .................. 123/609, 123/620, 636-638, 640, 641; 701/101-103, 701/110, 111
See application file for complete search history.

(56) References Cited

U.S. PATENT DOCUMENTS

| | | | | |
|---|---|---|---|---|
| 4,271,811 | A | 6/1981 | Suzuki et al. | |
| 4,341,195 | A * | 7/1982 | Nishio et al. | 123/636 |
| 5,247,919 | A | 9/1993 | Akaki et al. | |
| 5,425,339 | A | 6/1995 | Fukui | |
| 6,006,727 | A | 12/1999 | Katashiba et al. | |
| 6,155,241 | A | 12/2000 | Hohner et al. | |
| 6,213,108 | B1 | 4/2001 | Boyer et al. | |
| 6,526,953 | B1 * | 3/2003 | Inagaki | 123/609 |
| 7,104,043 | B2 | 9/2006 | Zhu et al. | |
| 7,302,932 | B2 | 12/2007 | Shelby et al. | |
| 7,404,396 | B2 * | 7/2008 | Toriyama et al. | 123/637 |
| 2007/0079817 | A1 | 4/2007 | VanDyne et al. | |

FOREIGN PATENT DOCUMENTS

JP 2001107831 A * 4/2001

* cited by examiner

*Primary Examiner* — Willis Wolfe, Jr.
(74) *Attorney, Agent, or Firm* — Julia Voutyras; Brooks Kushman P.C.

(57) ABSTRACT

Systems and methods for controlling an internal combustion engine include determining presence of charge dilution and selecting a spark restrike mode to provide multiple spark events during a single combustion cycle. Charge dilution may be determined based on commanded air/fuel ratio and exhaust gas recirculation, for example. Multiple spark events may be controlled using time-based restrike or current-based restrike in response to one or more operating parameters or conditions.

14 Claims, 3 Drawing Sheets

ENGINE CONTROL USING SPARK RESTRIKE/MULTI-STRIKE

BACKGROUND

1. Technical Field

Embodiments of the present disclosure relate to control of an internal combustion engine using multiple sparks during a single combustion cycle.

2. Background

Various strategies are used to increase power density and downsize engines, i.e. provide smaller, lighter engines with power equal to or greater than more conventional larger and heavier engines. For example, lean air/fuel ratio operation, and cooled external exhaust gas recirculation (EGR) on boosted (turbocharged or supercharged) engines may be used to increase power density. Typically, these smaller engines operate at higher loads where pumping losses are reduced to further improve fuel economy. However, combustible mixtures supplied to the engine cylinders with high levels of dilution and lean air/fuel ratios are more difficult to ignite and to achieve complete combustion. In addition, high turbulence and high BMEP combustion conditions may lead to spark blowout.

Previous strategies for improving combustion have included increasing ignition energy by using larger spark plug gaps, raising the ignition coil output, and/or sparking multiple times. While these approaches may be suitable for some applications, increased ignition energy and/or unnecessary restriking may lead to premature spark plug wear and gap erosion resulting in associated combustion performance degradation, which may adversely impact fuel efficiency, drivability, and/or feedgas emissions.

Transient events, which may occur in response to a change in driver demand, such as an increase or decrease in accelerator pedal position, and/or in response to changing engine or ambient conditions, such as during engine warm-up, for example, may also lead to operating conditions with a dilute air/fuel charge. In port-injected engine applications, evaporation rate of the fuel puddle in the intake port is affected by differences in intake manifold filling and intake manifold pressure during increases and decreases in accelerator pedal/throttle valve positions, often referred to as tip-ins and tip-outs, respectively. Uncompensated air/fuel control would result in leaner than desired air/fuel ratios during tip-ins, and richer than desired air/fuel ratios during tip-outs. As such, the engine control strategy may increase fuel delivery to the engine for a period of time based on an empirically determined time constant established during engine development for the period of increased torque demand during a tip-in. Similarly, another empirically determined time constant may be applied by the engine control strategy to decrease fuel delivery for a period of time during decreased torque demand during a tip-out. This transient fuel compensation strategy is often performed in open loop fashion and relies on significant development resources related to data collection at various operating conditions for accurate calibration.

SUMMARY

Systems and methods for controlling an internal combustion engine according to embodiments of the present disclosure include determining presence of charge dilution and selecting a spark restrike mode to provide multiple spark events during a single combustion cycle. In one embodiment, charge dilution is determined based on commanded air/fuel ratio and exhaust gas recirculation. Multiple spark events may be controlled using time-based restrike or current-based restrike in response to one or more operating parameters or conditions, such as accelerator pedal position, throttle position, in-cylinder pressure, engine speed, battery voltage, and ignition coil temperature, for example. In one embodiment, a method for controlling an internal combustion engine includes determining dilution and controlling spark restrike in response to ignition coil current.

The present disclosure includes embodiments having various advantages. For example, the present disclosure provides embodiments that facilitate more accurate control of spark multi-strike or restrike events to maintain combustion quality, meet spark plug and ignition coil durability targets, and reduce parasitic electrical loading, which may have fuel economy benefits. In addition, current based restrike facilitates faster delivery of ignition energy in the event of spark blowout relative to strategies that rely only on time based restrike.

The above advantage and other advantages and features will be readily apparent from the following detailed description of the preferred embodiments when taken in connection with the accompanying drawings.

BRIEF DESCRIPTION OF THE DRAWINGS

Embodiments of the present disclosure described herein are recited with particularity in the appended claims. However, other features will become more apparent, and the embodiments may be best understood by referring to the following detailed description in conjunction with the accompanying drawings, in which:

DETAILED DESCRIPTION

Figure 1:
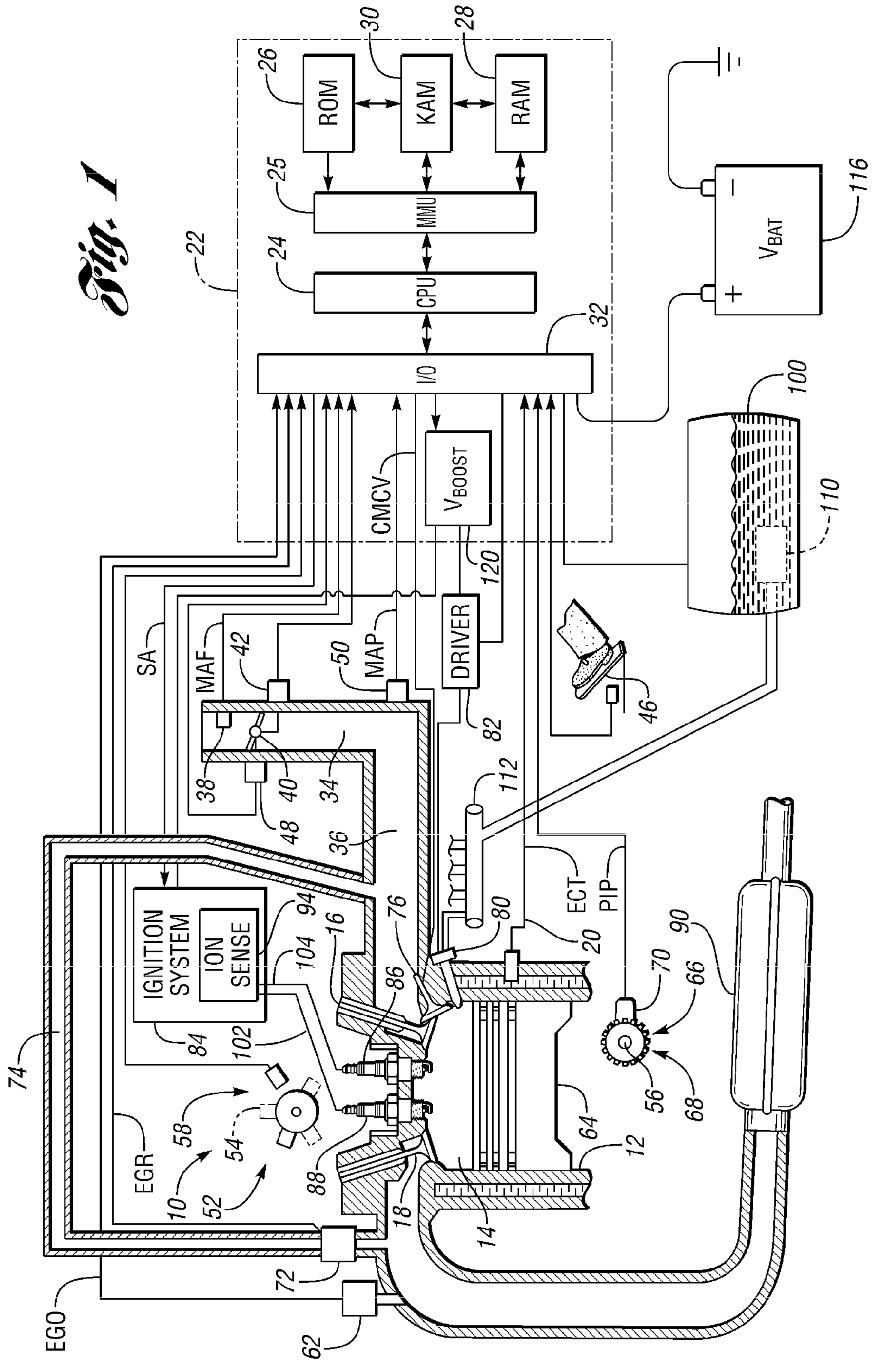
FIG. 1 is a schematic diagram illustrating operation of a system or method for controlling spark restrike/multistrike in an internal combustion engine according to embodiments of the present disclosure.

As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a multi-cylinder, internal combustion engine having at least one spark plug per cylinder. Various embodiments may include one or more spark plugs that also function as an ionization sensor. However, the teachings of the present disclosure may also be used in applications having a separate ionization sensor and/or other types of combustion quality and air/fuel ratio sensors, for example. Those of ordinary skill in the art may recognize similar applications or implementations with other engine/vehicle technologies.

System 10 includes an internal combustion engine having a plurality of cylinders, represented by cylinder 12, with corresponding combustion chambers 14. As one of ordinary skill in the art will appreciate, system 10 includes various sensors and actuators to effect control of the engine. A single sensor or actuator may be provided for the engine, or one or more sensors or actuators may be provided for each cylinder 12, with a representative actuator or sensor illustrated and described. For example, each cylinder 12 may include four actuators that operate intake valves 16 and exhaust valves 18 for each cylinder in a multiple cylinder engine. However, the engine may include only a single engine coolant temperature sensor 20.

Controller 22, sometimes referred to as an engine control module (ECM), powertrain control module (PCM) or vehicle control module (VCM), has a microprocessor 24, which is part of a central processing unit (CPU), in communication with memory management unit (MMU) 25. MMU 25 controls the movement of data among various computer readable storage media and communicates data to and from CPU 24. The computer readable storage media may include volatile and nonvolatile storage in read-only memory (ROM) 26, random-access memory (RAM) 28, and keep-alive memory (KAM) 30, for example. KAM 30 may be used to store various operating variables while CPU 24 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. The computer-readable storage media may also include floppy disks, CD-ROMs, hard disks, and the like. Some controller architectures do not contain an MMU 25. If no MMU 25 is employed, CPU 24 manages data and connects directly to ROM 26, RAM 28, and KAM 30. Of course, more than one CPU 24 may be used to provide engine control and controller 22 may contain multiple ROM 26, RAM 28, and KAM 30 coupled to MMU 25 or CPU 24 depending upon the particular application. Likewise, various engine and/or vehicle control functions may be performed by an integrated controller, such as controller 22, or may be controlled in combination with, or separately by one or more dedicated purpose controllers.

In one embodiment, the computer readable storage media include stored data or code representing instructions executable by controller 22 to control a multiple cylinder internal combustion engine having at least one spark plug per cylinder. The code includes instructions that calculate an ignition coil dwell, determine charge dilution, and select a restrike mode based on current engine and/or operating parameters/conditions. The code may also include instructions that determine duration of a current-based restrike mode and determine the number of restrikes for a time-based restrike mode in response to engine and/or ambient operating conditions/parameters as described in greater detail herein.

System 10 includes an electrical system powered at least in part by a battery 116 providing a nominal voltage, VBAT, which is typically either 12V or 24V, to power controller 22. As will be appreciated by those of ordinary skill in the art, the nominal voltage is an average design voltage with the actual steady-state and transient voltage provided by the battery varying in response to various ambient and operating conditions that may include the age, temperature, state of charge, and load on the battery, for example. Power for various engine/vehicle accessories may be supplemented by an alternator/generator during engine operation as well known in the art. A high-voltage power supply 120 may be provided in applications using direct injection and/or to provide the bias voltage for applications having ion current sensing. Alternatively, ion sensing circuitry may be used to generate the bias voltage using the ignition coil and/or a capacitive discharge circuit for engines using ion current sensing.

In applications having a separate high-voltage power supply, power supply 120 generates a boosted nominal voltage, VBOOST, relative to the nominal battery voltage and may be in the range of 85V-100V, for example, depending upon the particular application and implementation. Power supply 120 may be used to power fuel injectors 80 and one or more ionization sensors, which may be implemented by at least one spark plug 86, 88, or by a dedicated ionization sensor in applications having this feature. While FIG. 1 illustrates an application having two spark plugs 86, 88 per cylinder, the control systems and methods of the present disclosure are applicable to applications having only a single spark plug per cylinder, and to applications that may include one or more alternative sensors to provide an indication of combustion quality and air/fuel ratio during operation.

CPU 24 communicates with various sensors and actuators effecting combustion within cylinder 14 via an input/output (I/O) interface 32. Interface 32 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that may be actuated under control of CPU 24, through I/O interface 32, are fuel injection timing, fuel injection rate, fuel injection duration, throttle valve position, spark plug ignition timing, ionization current sensing and conditioning, charge motion control, valve timing, exhaust gas recirculation, and others. Sensors communicating input through I/O interface 32 may indicate piston position, engine rotational speed, vehicle speed, coolant temperature, intake manifold pressure, accelerator pedal position, throttle valve position, air temperature, exhaust temperature, exhaust air to fuel ratio, exhaust constituent concentration, battery voltage, ignition coil temperature, and air flow, for example. One or more operating parameters may be estimated or inferred using one or more sensor values. For example, charge dilution may be estimated or inferred from commanded exhaust gas recirculation (EGR), variable cam timing (VCT) valve overlap and equivalence ratio. Charge motion may be estimated or inferred from the state of a charge motion control valve and engine speed, for example. In-cylinder pressure (ICP) and temperature (ICT) may be inferred from EGR, airflow, engine speed, and equivalence ratio, etc.

In operation, air passes through intake 34 and is distributed to the plurality of cylinders via an intake manifold, indicated generally by reference numeral 36. System 10 preferably includes a mass airflow sensor 38 that provides a corresponding signal (MAF) to controller 22 indicative of the mass airflow. A throttle valve 40 may be used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or demanded torque indicated by an operator via accelerator pedal 46. A throttle position sensor 48 provides a feedback signal (TP) to controller 22 indicative of the actual position of throttle valve 40 to implement closed loop control of throttle valve 40. Accelerator pedal position or throttle valve position or change in position may be used to indicate or activate a transient operating mode.

A manifold absolute pressure sensor 50 is used to provide a signal (MAP) indicative of the manifold pressure to controller 22. Air passing through intake manifold 36 enters combustion chamber 14 through appropriate control of one or more intake valves 16. Intake valves 16 and/or exhaust valves 18 may be controlled using electromagnetic valve actuators to provide variable valve timing (VVT), using a variable cam timing (VCT) device to control intake and/or exhaust valve timing, or using a conventional camshaft arrangement, indicated generally by reference numeral 52. Depending upon the particular technology employed, air/fuel ratio and associated dilution within a cylinder or group of cylinders may be adjusted by controlling the intake and/or exhaust valve timing to control internal and/or external EGR or to control intake airflow, for example. In some applications, mixing of inducted air and fuel may be enhanced by control of an intake manifold runner control device or charge motion control valve 76. In the embodiment illustrated in FIG. 1, camshaft arrangement 52 includes a camshaft 54 that completes one revolution per combustion or engine cycle, which requires two revolutions of crankshaft 56 for a four-stroke engine, such that camshaft 54 rotates at half the speed of crankshaft 56. Rotation of camshaft 54 (or controller 22 in a variable cam timing or camless VVT engine application) controls one or more exhaust valves 18 to exhaust the combusted air/fuel mixture through an exhaust manifold. A portion of the exhaust gas may be redirected by exhaust gas recirculation (EGR) valve 72 through an EGR circuit 74 to intake 36. Depending upon the particular application and implementation, external recirculated exhaust gas may flow through an EGR cooler (not shown) and implemented as high-pressure and/or low-pressure EGR in boosted applications. EGR valve 72 may be controlled by controller 22 to control the amount of EGR based on current operating and ambient conditions.

A sensor 58 provides a signal for determining rotational position of the camshaft. Cylinder identification sensor 58 may include a single-tooth or multi-tooth sensor wheel that rotates with camshaft 54 with rotation detected by a Hall effect or variable reluctance sensor. Cylinder identification sensor 58 may be used to identify the position of a designated piston 64 within cylinder 12 for use in determining fueling, ignition timing, and/or ion sensing, for example. Additional rotational position information for controlling the engine is provided by a crankshaft position sensor 66 that includes a toothed wheel 68 and an associated sensor 70.

An exhaust gas oxygen sensor 62 provides a signal (EGO) to controller 22 indicative of whether the exhaust gasses are lean or rich of stoichiometry. Depending upon the particular application, sensor 62 may by implemented by a HEGO sensor or similar device that provides a two-state signal corresponding to a rich or lean condition. Alternatively, sensor 62 may be implemented by a UEGO sensor or other device that provides a signal proportional to the stoichiometry of the exhaust feedgas. This signal may be used to adjust the air/fuel ratio in combination with information provided by the ionization sensor(s) as described herein. In addition, the EGO signal may be used to control the operating mode of one or more cylinders, for example. As also known, EGO sensors operate only after reaching a minimum operating temperature, which may take anywhere from a few seconds to a few minutes depending upon the engine and ambient operating conditions, during which transient operating conditions exist and may benefit from the spark restrike control according to the present disclosure.

The exhaust feedgas is passed through the exhaust manifold and one or more emission control or treatment devices 90 before being exhausted to atmosphere.

A fuel delivery system includes a fuel tank 100 with a fuel pump 110 for supplying fuel to a common fuel rail 112 that supplies injectors 80 with pressurized fuel. In some direct-injection applications, a camshaft-driven high-pressure fuel pump (not shown) may be used in combination with a low-pressure fuel pump 110 to provide a desired fuel pressure within fuel rail 112. Fuel pressure may be controlled within a predetermined operating range by a corresponding signal from controller 22.

In the representative embodiment illustrated in FIG. 1, fuel injector 80 is side-mounted on the intake side of combustion chamber 14, typically between intake valves 16, and injects fuel directly into combustion chamber 14 in response to a command signal from controller 22 processed by driver 82. Of course, the teachings of the present disclosure may also be used in applications having fuel injector 80 centrally mounted through the top or roof of cylinder 14, or with a port-injected configuration, for example. Likewise, some applications may include a combination port/direct injection arrangement. Spark mode selection and control according to the present disclosure may be particularly useful in port-injected applications to better accommodate intake manifold filling effects as well as the effect of pressure dynamics on fuel puddle evaporation, which may be less significant in direct injection or combination port/direct injection applications.

Driver 82 may include various circuitry and/or electronics to selectively supply power from high-voltage power supply 120 to actuate a solenoid associated with fuel injector 80 and may be associated with an individual fuel injector 80 or multiple fuel injectors, depending on the particular application and implementation. Although illustrated and described with respect to a direct-injection application where fuel injectors often require high-voltage actuation, those of ordinary skill in the art will recognize that the teachings of the present disclosure may also be applied to applications that use port injection or combination strategies with multiple injectors per cylinder and/or multiple fuel injections per cycle as previously described.

In the embodiment of FIG. 1, fuel injector 80 injects a quantity of fuel directly into combustion chamber 14 in one or more injection events for a single engine cycle based on the current operating mode in response to a signal (fpw) generated by controller 22 and processed and powered by driver 82. At the appropriate time during the combustion cycle, controller 22 generates signals (SA) processed by ignition system 84 to individually control at least one spark plug 86, 88 associated with a single cylinder 12 during the power stroke of the cylinder to initiate combustion within chamber 14. As described in greater detail herein, a spark operating mode may be selected based on current engine and/or ambient operating conditions/parameters to provide a single spark or multiple spark events, referred to as restrike or multistrike spark, during a single combustion cycle in a single cylinder to deliver appropriate ignition energy to the combustion chamber to achieve stable combustion under current operating conditions.

For applications having ion current sensing, ignition system 84 may include an ion sense circuit 94 associated with one or both of the spark plugs 86, 88 in one or more cylinders 12. Ion sense circuit 94 operates to selectively apply a bias voltage to at least one of spark plugs 86, 88 after spark discharge(s) to generate a corresponding ion sense signal for analysis by controller 22 to determine combustion quality and/or air/fuel ratio of the combustion event. When present, the ion sense signal may be used by controller 22 for various diagnostic and combustion control purposes with the sensed air/fuel ratio determined by processing at least one characteristic of the ion sense signal, such as peak value, duration, integral, timing, etc. In one embodiment, the ion sense signal is used to provide an indication of combustion quality, actual or sensed air/fuel ratio, and in-cylinder pressure (ICP).

Controller 22 includes code implemented by software and/or hardware to control system 10. Controller 22 generates coil dwell signals to initiate coil charging and subsequent spark discharge for at least one spark plug 86, 88 and may detect or determine the primary current and secondary current of the ignition coil for use in controlling spark restrike or multi-strike. In one embodiment, controller 22 initiates multiple spark discharges per spark plug per cylinder in each combustion cycle when operating with charge dilution, with the multiple spark discharge or restrike controlled in response to ignition coil primary and secondary current. Another restrike mode may include a time-based restrike mode where subsequent charging of the ignition coil is initiated based on elapsed time from a previous spark discharge. A single spark discharge per spark plug per cylinder for each combustion cycle may be used when charge dilution is not present as described in greater detail with reference to FIG. 4.

For applications having ion sense, controller 22 may monitor an ionization sensing signal during the period after anticipated or expected spark discharge of the at least one spark plug 86, 88 to provide information relative to combustion quality to manage fuel economy, emissions, and performance in addition to detecting various conditions that may include engine knock, misfire, pre-ignition, etc.

Figure 2:
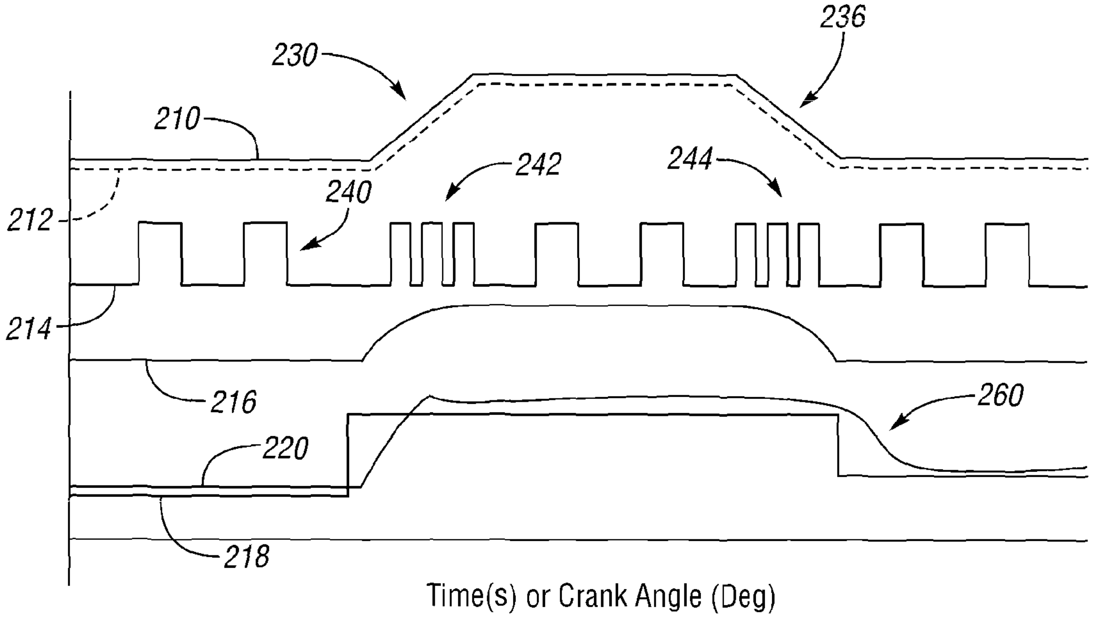
FIG. 2 illustrates representative signals and parameters for controlling spark restrike for an internal combustion engine operating with dilute air/fuel charge according to embodiments of the present disclosure.

FIG. 2 illustrates signals used for engine control during representative acceleration and deceleration transient events employing spark restrike according to one embodiment of the present disclosure. Representative signals may be provided by an associated sensor, inferred from one or more sensors, or determined by controller 22 (FIG. 1) as previously described.

In the embodiment illustrated in FIG. 2, representative signals include an accelerator ped/throttle signal 210, an engine load/air charge signal 212, an ignition coil control signal 214, an engine speed signal (RPM) 216, a desired or commanded exhaust gas recirculation (EGR) signal 218, and an actual EGR signal 220). Other commanded or inferred signals may include an air/fuel ration (A/F) signal and an ion sense signal for applications so equipped. Those of ordinary skill in the art will recognize that various other measured or inferred signals or parameters may be used to control spark restrike and to detect a transient event consistent with the teachings of the present disclosure.

Depending on the particular application and implementation, alternative signals/indicators or multiple signals/indicators may be used to better detect or discriminate between or among various events to improve robustness of the system. For example, a transient event may be indicated by a change in RPM signal 216, by pedal/throttle signal 210 and/or load/air charge signal 210. Some signals/indicators may have associated characteristics that are advantageous or disadvantageous for particular applications or events. For example, as shown in FIG. 2, the load/air charge signal 212 will generally lag the pedal/throttle signal 210 and the RPM signal 216 for an acceleration event 230. As such, the particular restrike control strategy or scheduling may be adjusted accordingly based on the particular signal(s)/indicator(s) used to detect a triggering event. Different signal(s)/indicator(s) may be used to detect or indicate an acceleration event or other even having an associated increase in charge dilution relative to the signal(s)/indicator(s) used to detect a deceleration event or other event having an associated decrease in charge dilution.

As shown in FIG. 2, ignition or spark timing signal 214 includes a single strike mode 240 during which a single spark discharge per spark plug per cylinder per combustion cycle is scheduled when operating without charge dilution. A multi-strike or restrike mode 242, 244 may be used to deliver additional ignition energy to the combustion chambers to provide stable combustion when operating with charge dilution by providing an initial spark discharge followed by one or more additional spark discharges during a single combustion cycle within each cylinder and for one or more spark plugs associated with the cylinder. For applications having two or more spark plugs per cylinder, restrike may be performed for only one of the spark plugs, or may be applied to multiple spark plugs in the same cylinder depending on the particular application and implementation.

Operating with charge dilution may be associated with a variety of engine and ambient operating conditions or events and is not limited to transient events. Charge dilution may be determined based on air/fuel ratio exceeding a corresponding dilution threshold, also referred to as operating lean, and may occur under steady-state light load operation at lower engine speeds, for example. Exhaust gas recirculation (EGR), typically designated as a percentage of total intake airflow, may also be used to determine charge dilution and/or incorporated into the air/fuel ratio determination.

For example, when the throttle is opened as indicated at 230, it is possible that slightly lean operation or other factors impacting chare dilution, such as in-cylinder motion and increased pressure, may benefit from increased ignition energy to reduce or minimize poor combustion. Similarly, when the throttle is closed at 236, emptying of the intake manifold takes a number of cylinder events or combustion cycles to evacuate the manifold of EGR, such as illustrated by the commanded or desired EGR 218 relative to the actual EGR 220 at 260. During this period, it is possible for highly dilute charge mixture to exist, which could result in poor combustion including partial burns and misfires if left uncompensated. Under these transient conditions, a control strategy according to the present disclosure detects the transient event by monitoring one or more operating parameters or sensor signals as previously described, and implements spark restrike to provide additional ignition energy to improve or otherwise mitigate poor combustion. As described in greater detail with reference to FIGS. 3 and 4, a time-based or current-based restrike strategy may be used depending on the particular implementation and/or operating conditions.

Figure 3:
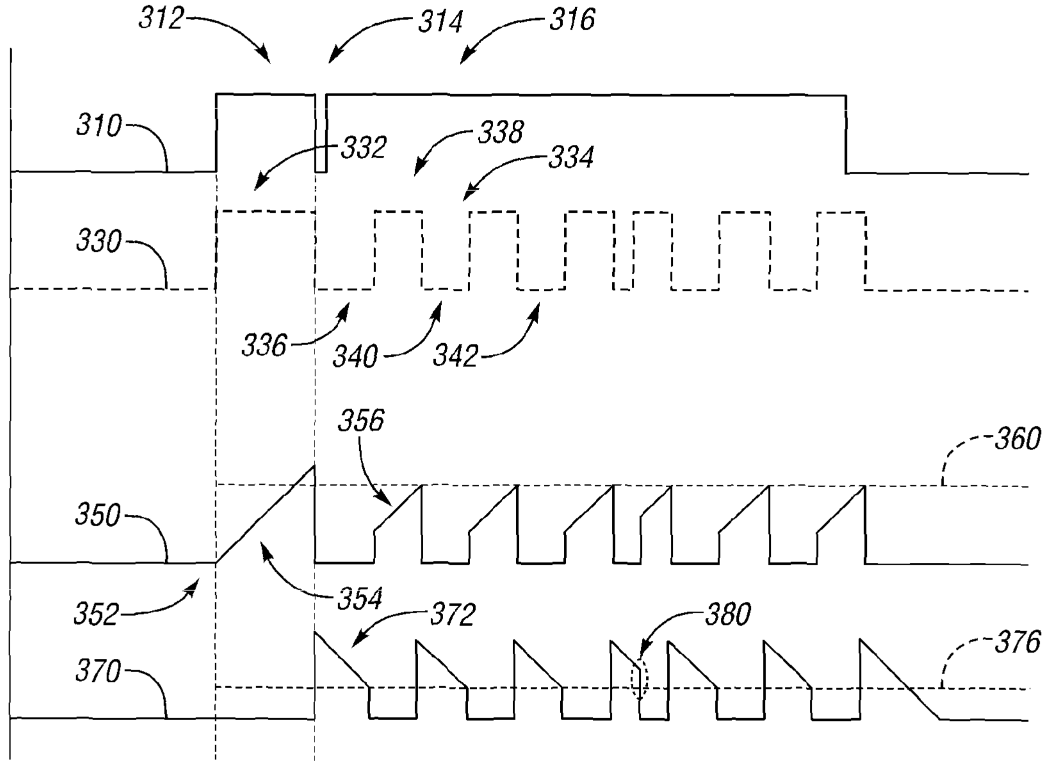
FIG. 3 illustrates command signals and ignition coil currents for time based and current based spark restrike control in various embodiments according to the present disclosure.

FIG. 3 illustrates a representative combustion cycle to compare a time-based and a current-based spark restrike operating mode for multiple spark discharge control according to embodiments of the present invention. Signal 310 represents a control signal from engine controller 22 that is asserted during an initial spark discharge period 312 and a spark restrike period 316, both of which are determined based on current operating conditions, typically using one or more look-up tables as known to those of skill in the art. The initial spark discharge period 312 is separated from restrike period 316 by a period 314 where the signal is not asserted.

Line 330 represents an ignition coil dwell command that controls charging of the primary winding of the ignition coil during which current flows through the primary winding creating an electromagnetic field. When the charging current is stopped, the electromagnetic field collapses creating a current in the secondary winding that, if sufficient, results in a spark discharge across the spark plug gap. In one embodiment of time-based restrike according to the present disclosure, the dwell command that controls charging of the ignition coil primary for both the initial (or single/only) strike (also referred to as spark discharge) 332 and restrikes 334 is generated directly by controller 22 (FIG. 1). Time-based restrike may be used in various applications and/or under certain operating conditions. Time-based restrike is tuned or calibrated for particular operating conditions with the "on" or dwell/re-dwell time 338 and the "off" time 336 between subsequent coil charging events typically determined using look-up tables based on operating conditions/parameters such as engine speed, temperature, and load, for example. While actual times may vary by application and operating conditions, the "on" and "off" times are on the order of microseconds, and are generally fixed during a particular combustion cycle so that each restrike interval is the same, as generally represented by intervals 336, 340, and 342.

When combustion requirements increase (such as with charge dilution present), recovery dwell may not switch at a high enough primary winding current to compensate for the spark discharge and result in less efficient combustion. Similarly, when combustion requirements decrease, recovery dwell switch current may be too high for the operating conditions.

In one embodiment of current-based multiple spark discharge control according to the present disclosure, control signal 310 from engine controller 22 is asserted during an initial spark discharge period 312 and a restrike period 316 with the dwell/redwell signal 330 generated internally by the ignition coil and controlled based on the primary and secondary winding currents. Other embodiments may use controller 22 to directly control the ignition coil dwell based on primary and secondary winding currents as described herein.

Control signal 310 initiates charging of the ignition coil as indicated by ignition coil primary winding current 350 at 352 for the primary or initial spark discharge. Primary winding current 350 increases at 354 during the initial coil dwell period 312 until stopped at 314 initiating a spark discharge. Secondary winding current decreases at 372 until reaching or falling below an associated secondary coil restrike threshold 376, initiating charging of the ignition coil primary winding as indicated during the subsequent dwell/redwell period indicated at 356. Primary winding current 350 continues to increase (charge) until the primary winding current exceeds an associated primary coil restrike threshold 360. Subsequent spark discharges are then controlled in response to ignition coil current by initiating charging of the primary winding when secondary winding current 370 falls below the associated threshold 376 and stopping charging to initiate spark discharge when primary winding current 350 exceeds associated primary winding restrike threshold 360.

In one application, representative values for primary current restrike threshold 360 is 12 A (amps), while secondary current restrike threshold 376 is 30 ma (milliamps), for example. Threshold 360 and/or 376 may be fixed, or may vary based on engine and/or ambient operating conditions depending on the particular application and implementation.

Use of a current-based control strategy for multiple spark discharge or restrike can better adapt and mitigate poor combustion under some operating conditions as compared to a time-based control strategy. For example, a condition referred to as spark blowout may occur with dilute air/fuel mixtures and high turbulence within the cylinder where the in-cylinder flow disrupts the current arc across the spark plug gap. This results in a sudden decrease of secondary winding current as represented at 380. However, a redwell is initiated as soon as the secondary current falls below the associated threshold 376, rather than having to wait for timeout of the associated interval in a time-based control strategy. As such, current-based restrike control automatically compensates for spark discharge at a given engine operating condition with both the primary winding and secondary winding current switch levels (thresholds) fixed independent of the spark discharge. Appropriate control of multiple spark discharges avoids the reduced plug life, increased coil heating, and parasitic electrical losses otherwise associated with unnecessary restrikes.

Figure 4:
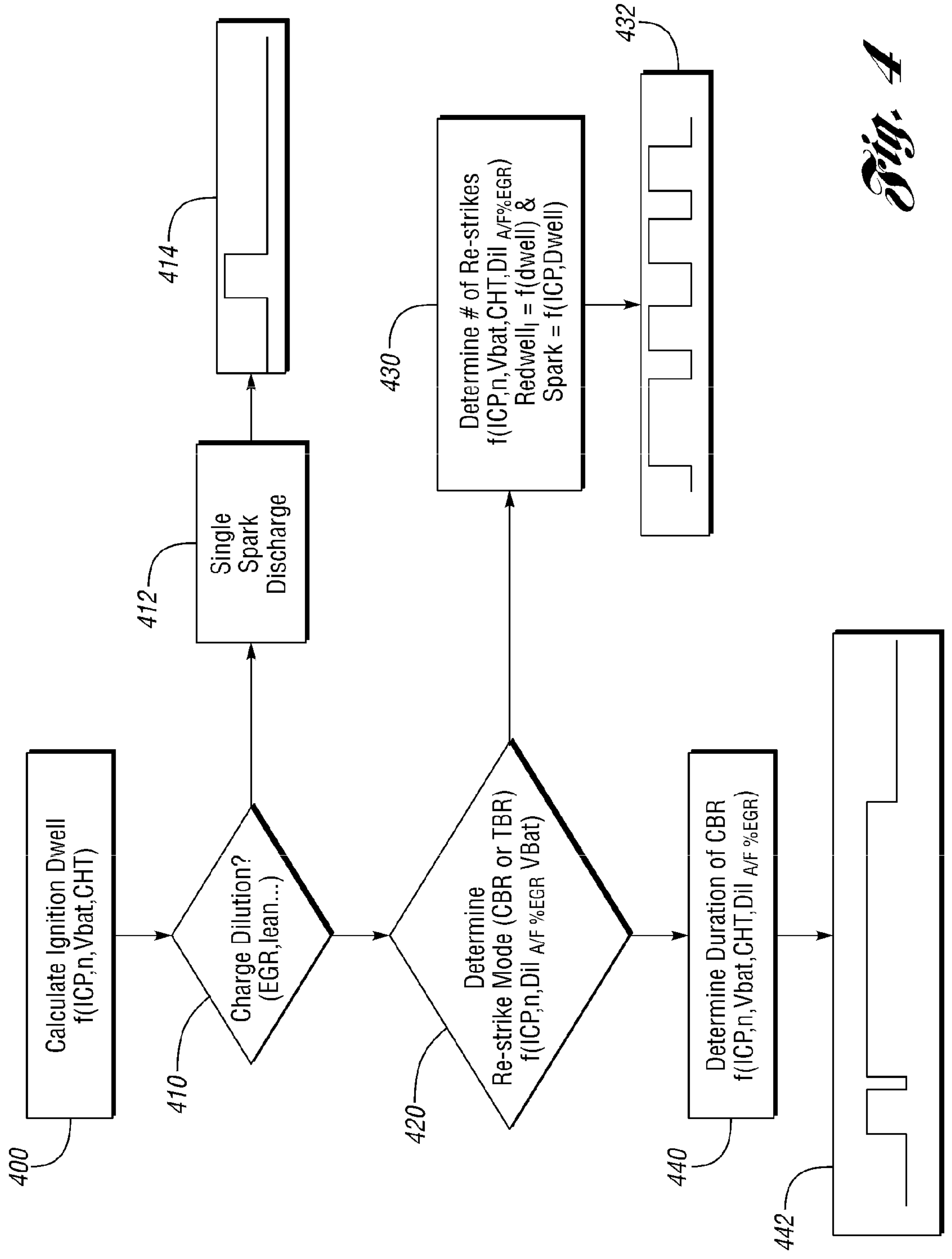
FIG. 4 is a flow chart illustrating operation of a system or method for controlling an internal combustion engine according to one embodiment of the present disclosure.

FIG. 4 is a flow chart illustrating operation of a system or method for controlling an internal combustion engine to provide multiple spark discharge events for at least one spark plug during a single combustion cycle according to embodiments of the present disclosure. As those of ordinary skill in the art will understand, the functions represented by the flow chart may be performed by software and/or hardware. Depending upon the particular processing strategy, such as event-driven, interrupt-driven, etc., the various functions may be performed in an order or sequence other than illustrated in the Figures. Similarly, one or more steps or functions may be repeatedly performed, or omitted, although not explicitly illustrated. In one embodiment, the functions illustrated are primarily implemented by software, instructions, or code stored in a computer readable storage medium and executed by a microprocessor-based computer or controller, such as represented by controller 22, to control operation of the engine.

Block 400 of FIG. 4 represents determining an ignition coil dwell period in response to current operating conditions for an initial spark discharge. Various engine and/or ambient operating conditions/parameters may be used such as in-cylinder pressure (ICP), engine speed (n), batter voltage (Vbat) and cylinder head temperature (CHT), for example. One or more operating conditions or parameters may be estimated or inferred rather than measured.

Block 410 represents determining whether charge dilution is present, which may be based on various engine operating conditions, such as EGR rate or percentage, air/fuel ratio, equivalence ratio, state of charge motion control device(s), etc. When not operating with charge dilution as determined by block 410, the system/method may include initiating a single spark discharge as indicated by block 412 with an associated control signal 414 to generate a single spark discharge per spark plug per cylinder.

Blocks 430 and 440 represent initiating multiple spark discharges per spark plug per cylinder in each combustion cycle when operating with charge dilution as determined by block 420. For time-based restrike (TBR) control, block 430 represents determining the number of spark discharges for a cylinder based on current operating conditions, which may include in-cylinder pressure (ICP), engine speed (n), battery voltage (Vbat), dilution parameter/rate (Dil), etc. Each time-based restrike interval will include a redwell period and spark period as represented by the command signal of block 432. The redwell period may be determined as a function of the dwell period determined at 400 and the spark period may be determined by as a function of the in-cylinder pressure and the dwell period, for example. The number of restrikes determined by block 430 is then determined based on the redwell and spark periods.

After determining a number of spark discharges based on at least one of cylinder pressure, engine speed, battery voltage, ignition coil temperature (to protect coil from overheating), and dilution amount as represented by block 430, an appropriate command (dwell) signal is generated to initiate charging of the ignition coil primary winding for each spark discharge based on elapsed time from a previous spark discharge as represented by block 432.

When current-based restrike (CBR) is selected based on current ambient and/or operating conditions as represented by block 420, initiation of charging of the ignition coil primary winding and stopping of the charging is controlled in response to ignition coil current as previously described and as represented by blocks 440 and 442. Block 440 first determines the duration of a multiple spark discharge or restrike period as a function of in-cylinder pressure (ICP), battery voltage (Vbat), primary ignition coil circuitry (CHT), and dilution (dil). Primary circuit temperature (PCT) is correlated with ignition coil temperature and is used to maintain operating temperature of the coil within a desired range.

As such, the present disclosure provides embodiments that facilitate more accurate control of spark multi-strike or restrike events to maintain combustion quality, meet spark plug and ignition coil durability targets, and reduce parasitic electrical loading, which may have fuel economy benefits. In addition, current based restrike facilitates faster delivery of ignition energy in the event of spark blowout relative to strategies that rely only on time based restrike.

While one or more embodiments have been illustrated and described, it is not intended that these embodiments illustrate and describe all possible embodiments within the scope of the claims. Rather, the words used in the specification are words of description rather than limitation, and various changes may be made without departing from the spirit and scope of the disclosure. While various embodiments may have been described as providing advantages or being preferred over other embodiments or prior art implementations with respect to one or more desired characteristics, as one skilled in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Any embodiments described as less desirable than other embodiments or prior art implementations with respect to one or more characteristics may be desirable for particular applications and are not outside the scope of this disclosure.

What is claimed:

1. A method for controlling an engine having at least one spark plug per cylinder, comprising:
- initiating multiple spark discharges per spark plug per cylinder in each combustion cycle when operating with charge dilution wherein charge dilution is determined based on exhaust gas recirculation exceeding an associated threshold; and
- initiating a single spark discharge per spark plug per cylinder otherwise.

2. A method for controlling an engine having at least one spark plug per cylinder, comprising:
- initiating multiple spark discharges per spark plug per cylinder in each combustion cycle when operating with charge dilution wherein charge dilution is determined based on commanded air/fuel ratio exceeding an associated threshold; and
- initiating a single spark discharge per spark plug per cylinder otherwise.

3. A method for controlling a multiple cylinder internal combustion engine having at least one spark plug per cylinder, the method comprising:
- initiating multiple spark discharges per spark plug per cylinder in each combustion cycle when operating with charge dilution;
- initiating a single spark discharge per spark plug per cylinder otherwise;
- detecting a transient operating condition; and
- initiating multiple spark discharges per spark plug per cylinder per combustion cycle during the transient operating condition.

4. The method of claim 3 wherein charge dilution is determined based on operating state of a charge motion control device.

5. The method of claim 1 wherein detecting a transient operating condition comprises determining that a change in at least one of engine speed, load, torque, and air charge exceeds an associated transient rate threshold.

6. A method for controlling an engine having at least one spark plug per cylinder, comprising:
- initiating multiple spark discharges per spark plug per cylinder by initiating charging of an ignition coil primary winding when ignition coil secondary winding current falls below an associated secondary coil restrike threshold; and
- initiating a single spark discharge per spark plug per cylinder otherwise.

7. The method of claim 6 further comprising disabling charging of the ignition coil primary winding when the primary winding current exceeds an associated primary coil restrike threshold.

8. A method for controlling an engine having at least one spark plug per cylinder, comprising:
- initiating multiple spark discharges per spark plug per cylinder in each combustion cycle when operating with charge dilution by initiating charging of an ignition coil primary based on time elapsed from a previous spark discharge; and
- initiating a single spark discharge per spark plug per cylinder otherwise.

9. The method of claim 8 further comprising determining a number of spark discharges for a cylinder based on engine speed and cylinder pressure.

10. A method for controlling an internal combustion engine having a plurality of cylinders with at least one spark plug per cylinder, the method comprising:
- determining an ignition coil dwell period in response to current operating conditions for an initial spark discharge;
- determining whether charge dilution is active, based on at least one of an exhaust gas recirculation exceeding an associated threshold, a commanded air/fuel ratio exceeding the associated threshold, and an operating state of a charge motion control motion device;
- operating using only the initial spark discharge per spark plug per cylinder per combustion cycle if charge dilution is not active; and
- operating using the initial spark discharge and at least one additional spark discharge per spark plug per cylinder per combustion cycle if charge dilution is active.

11. The method of claim 10 wherein operating using at least one additional spark discharge comprises:
- determining a number of spark discharges based on at least one of cylinder pressure, engine speed, battery voltage, ignition coil temperature, and dilution amount; and
- initiating charging of an ignition coil primary winding for each spark discharge based on elapsed time from a previous spark discharge.

12. The method of claim 10 wherein operating using at least one additional spark discharge comprises:

determining a restrike period; and controlling charging of an ignition coil primary winding in response to ignition coil current.

13. The method of claim 12 wherein controlling charging of the ignition coil primary winding comprises:

initiating charging of the primary winding when secondary winding current falls below an associated secondary winding restrike threshold.

14. The method of claim 13 further comprising:

stopping charging of the primary winding when primary winding current exceeds an associated primary winding restrike threshold.

* * * * *